United States Patent [19]
Wilhelm et al.

[11] Patent Number: 5,956,747
[45] Date of Patent: Sep. 21, 1999

[54] PROCESSOR HAVING A PLURALITY OF PIPELINES AND A MECHANISM FOR MAINTAINING COHERENCY AMONG REGISTER VALUES IN THE PIPELINES

[75] Inventors: Neil Wilhelm, Menlo Park; Robert Yung, Fremont, both of Calif.

[73] Assignee: Sun Microsystems, Inc., Mountain View, Calif.

[21] Appl. No.: 08/842,861

[22] Filed: Apr. 17, 1997

Related U.S. Application Data

[63] Continuation of application No. 08/431,601, May 1, 1995, abandoned, which is a continuation-in-part of application No. 08/356,596, Dec. 15, 1994, abandoned.

[51] Int. Cl.⁶ .................................................. G06F 12/08
[52] U.S. Cl. ........................................................ 711/140
[58] Field of Search .................................... 711/118, 140, 711/141, 146; 395/800.23

[56] References Cited

U.S. PATENT DOCUMENTS

| | | | |
|---|---|---|---|
| 5,117,493 | 5/1992 | Jensen ...................................... | 711/140 |
| 5,261,053 | 11/1993 | Valencia ................................... | 711/133 |
| 5,600,848 | 2/1997 | Sproull et al. ...................... | 395/800.42 |
| 5,638,526 | 6/1997 | Nakada .................................... | 395/394 |

OTHER PUBLICATIONS

Article entitled "Design and Implementation of an Integrated Snooping Data Cache", Gaetano Borriello et al., University of California Berleley, Ca, Computer Science Division, Report No. UCB/CSD/84/199, Sep. 1984.

Johnson, "Superscalar Microprocessor Design", 1991, pp. 10–12, 45–46, 48–50, 107–110, 112–115, 122–125.

Handy, "The Cache Memory Book", 1993, pp. 128–129, 140–158.

*Primary Examiner*—Eddie P. Chan
*Assistant Examiner*—Kevin L. Ellis
*Attorney, Agent, or Firm*—James W. Rose

[57] ABSTRACT

A processor is disclosed. The processor includes a processing unit with a plurality of pipelines. Each of the pipelines execute instructions which may define source register values and destination register values from a register file. A plurality of memories is also provided, each associated with one of the plurality of pipelines respectively. A coherency mechanism is provided to maintain coherency among the register values in the plurality of pipelines and their associated memories. In one embodiment, each memory associated with the plurality of pipelines is a register cache. Each register cache stores register values that were just used or will soon be needed by the instructions that have or will be executed on the pipeline associated with the register cache. A variety of coherency mechanisms may be used to transfer register values from register cache to register cache and maintain coherency among the register values in the plurality of register caches. The coherency protocols include, but are not limited to ownership protocols, snooping protocols and a new protocol that permits only one addressable valid copy of a register value among all the register caches and the register file at a time.

30 Claims, 4 Drawing Sheets

REGISTER SCOREBOARD

| Register | Pipeline 1 | Pipeline 2 | ... | Cache 102z | Register File |
|---|---|---|---|---|---|
| R1 | 1 | 0 | 0 | 0 | 0 |
| R2 | 1 | 0 | 0 | 0 | 0 |
| R3 | 0 | 0 | 0 | 0 | 1 |
| R4 | 0 | 1 | 0 | 0 | 0 |
| R5 | 0 | 1 | 0 | 0 | 0 |
| R6 | 0 | 1 | 0 | 0 | 0 |
| R7 | 0 | 1 | 0 | 0 | 0 |
| ⋮ | | | | | |
| RM | | | | | |

FIG. 4

PROCESSOR HAVING A PLURALITY OF PIPELINES AND A MECHANISM FOR MAINTAINING COHERENCY AMONG REGISTER VALUES IN THE PIPELINES

CROSS REFERENCE TO RELATED APPLICATION

This is a continuation of application Ser. No. 08/431,601, filed May 1, 1995, now abandoned, which is a continuation-in-part of application Ser. No. 08/356,596, filed Dec. 15, 1994 (now abandoned).

BACKGROUND OF THE INVENTION

1. Field of the Invention

The present invention relates to computers, and more particularly, to a processor having distributed register caches and a cache coherency protocol for maintaining coherency among the register values in the distributed register caches.

2. Description of the Related Art

Referring to FIG. 1, a pipelined processor according to the prior art is shown. The processor 10 includes, among other elements, an instruction cache 12, an instruction prefetch unit 14, an instruction buffer 16, a dispatch unit 18, a processing unit 20, a register scoreboard unit 22, and a memory hierarchy 24. The processing unit 20 includes one or more pipelines 26a through 26z. The memory hierarchy 24 includes, from top to bottom, a register file (RF) 28, a data cache 30, the instruction cache 12, main memory 32, disk storage 34, and typically external memory (not shown). In some processors, the dispatch unit 18 is capable of issuing multiple (i) instructions per cycle. State of the art processors today can issue up to four (i=4) instructions per cycle.

During each clock cycle, the dispatch unit 18 checks the pipelines 26 available and ascertains the register values needed by the next (i) instructions in the instruction buffer 16 considered for dispatch. For the instructions among the next (i) instructions where resources are available, the dispatch unit 18, checks the register scoreboard 22 to determine if any of the needed register values are currently being recomputed in one of the pipelines 26a through 26z. If a needed register value is immediately available by a bypassing operation, the register value is bypassed to the pipeline 26 that is going to execute the instruction that needs the register value. If the register value is not immediately available because it is being recomputed, the instruction that needs the register value may be stalled. If a needed register value is not in the pipelines 26, the dispatch unit 18 accesses the memory containing the register file 28. The instructions among the (i) instructions where pipeline resources and register values are available are dispatched. When an instruction has completed execution, its results are written back to the register file 28 and made available to subsequent instructions.

The characteristics of the register file 28 are dictated by the instruction set developed for the processor 10. In other words, the instruction set defines the type and size of registers in the register file 28 available to the programmer. For example, the SPARC instruction set V9, jointly developed by Sun Microsystems, Inc., Mountain View, Calif. and SPARC International, Menlo Park, Calif., defines an integer register file having a maximum of five hundred and twenty (520) registers and a separate floating point register file, having up to thirty two (32) registers, and each register being sixty-four (64) bits wide. (Note, for the sake of simplicity, FIG. 1 illustrates a "generic" register file 28, and does not show separate integer and floating point register files.)

State of the art processors, such as the UltraSPARC™ processor from Sun Microsystems, the Power PC™ from Motorola and IBM, and the Alpha™ chip from Digital Equipment Corporation, share a number of similarities. Each of these processors use an on-chip static random access memory (SRAM) array for implementing their respective register files 28. To the best of the Applicants' knowledge, these processors all provide a number of read and write ports to both the integer and floating point register files 28 equal to the maximum number of register read and write ports that may be needed during a "worst case" cycle respectively. For the sake of illustrating a worst case cycle, an example involving the UltraSPARC processor and the V9 instruction set is provided.

The UltraSPARC processor is a four issue processor (i=4) that includes eight (8) pipelines. The eight pipelines include two integer units, one load/store unit; two graphics units; one branch unit; one add floating point unit (FPU); one multiply FPU; one divide/square root FPU. The V9 instruction set defines integer instructions that require up to two source register operands, and one destination operand. Load/store instruction can specify either one, two or three source operands. Floating point instructions can specify up to two source operands and one destination register. Consider a cycle where the four instructions considered for dispatch include three integer operations, each requiring two source operands, and one load/store operation, requiring three source operands. Since the UltraSPARC processor has two integer units and one load/store unit, only the two oldest integer instructions and the load/store instruction can be dispatched in the cycle. Since the resources are not available to dispatch the third integer instruction, it is stalled until a later cycle. Under these conditions, a total of seven (7) register read ports and three (3) register write ports are required for the SRAM containing the integer register file 28 in UltraSPARC. Since no other possible combination of dispatched instruction could require more read ports or write ports, the above the example represents a worst case cycle. Although not described herein, the SRAM containing the floating point register file 28 in UltraSPARC requires five read ports (5) and three (3) write ports. It is believed that the number of read and write ports for the SRAMs containing the register files in the Power PC, the Alpha chip, and other known processors is determined in a similar fashion using a worst case scenario.

A number of problems are associated with using multiport SRAMs to implement a register file 28 for a processor. For each cell in the SRAM array, a wordline, two pass transistors and a differential bit line pair is needed for each read and write port in the array. As a result, the size or pitch of each memory cell is relatively large because of the number of word lines, bit lines, and pass transistors associated with each memory cell. The increased pitch size of the individual cells means that the overall size of the memory array is larger and occupies a larger percentage of the area on the processor die. This detrimentally affects manufacturing yields of the processor, and drives up fabrication cost. The average time required to access a register value in the register file 28 is also adversely affected because of the longer word lines and bit lines, due to the overall larger size of the array. The number of pass transistors, word lines, and bit lines associated with each cell tend to increase the capacitive loading on each cell. The increased capacitive load on each cell makes it more difficult for the finite charge stored in each cell to drive the appropriate differential bit line pair. All the above problems are exacerbated with an increase in the number of pipelines in the processor and an increase in the maximum number of instructions that may be issued per cycle.

Several design trends are proliferating in the processor industry: larger issue processors; a greater number of pipelines in the processor unit; reduced cycle times; larger register files; and wider word widths. The implementation of the register file 28 in the SRAM memory array, with its complex read/write circuitry, relatively large size, and relatively slow access speeds, represents a substantial barrier to improving the performance for each of these trends. In fact, the Applicants believe that the SRAM memory array as described above has created a design impediment that in the next generation of processors, may discourage or even prevent further advancements in scalarity, an increase in word size, an increase in the size of the register file, and/or a reduction of cycle time.

SUMMARY OF THE INVENTION

The present invention relates to a processor having a processing unit with a plurality of pipelines. Each of the pipelines execute instructions which may define source register values and destination register values from a register file. A plurality of memories is also provided, each associated with one of the plurality of pipelines respectively. A coherency mechanism is provided to maintain coherency among the register values in the plurality of pipelines and their associated memories. In one embodiment, each memory associated with the plurality of pipelines is a register cache. Each register cache stores register values that were just used or will soon be needed by the instructions that have or will be executed on the pipeline associated with the register cache. A variety of coherency mechanisms may be used to transfer register values from register cache to register cache and maintain coherency among the register values in the plurality of register caches. The coherency protocols include, but are not limited to ownership protocols, snooping protocols and a new protocol that permits only one addressable valid copy of a register value among all the register caches and the register file at a time.

The present invention offers a number of advantages over the prior art. The distributed register caches tend to store register values that are relevant to the instruction that were previously or are expected to be executed on their associated pipeline. As a result, a large majority of the register values that are needed for the instructions to be executed on a pipeline are readily accessible with minimal latency. Further, since the register caches are relatively small memories with few read and write ports, many of the complexities and problems associated with the prior art SRAMs for storing register files are avoided.

DESCRIPTION OF THE DRAWINGS

The present invention will be apparent from the following description in which:

FIG. 4 illustrates a register table used by the processor of the present invention.

DESCRIPTION OF THE PREFERRED EMBODIMENT

Figure 1:
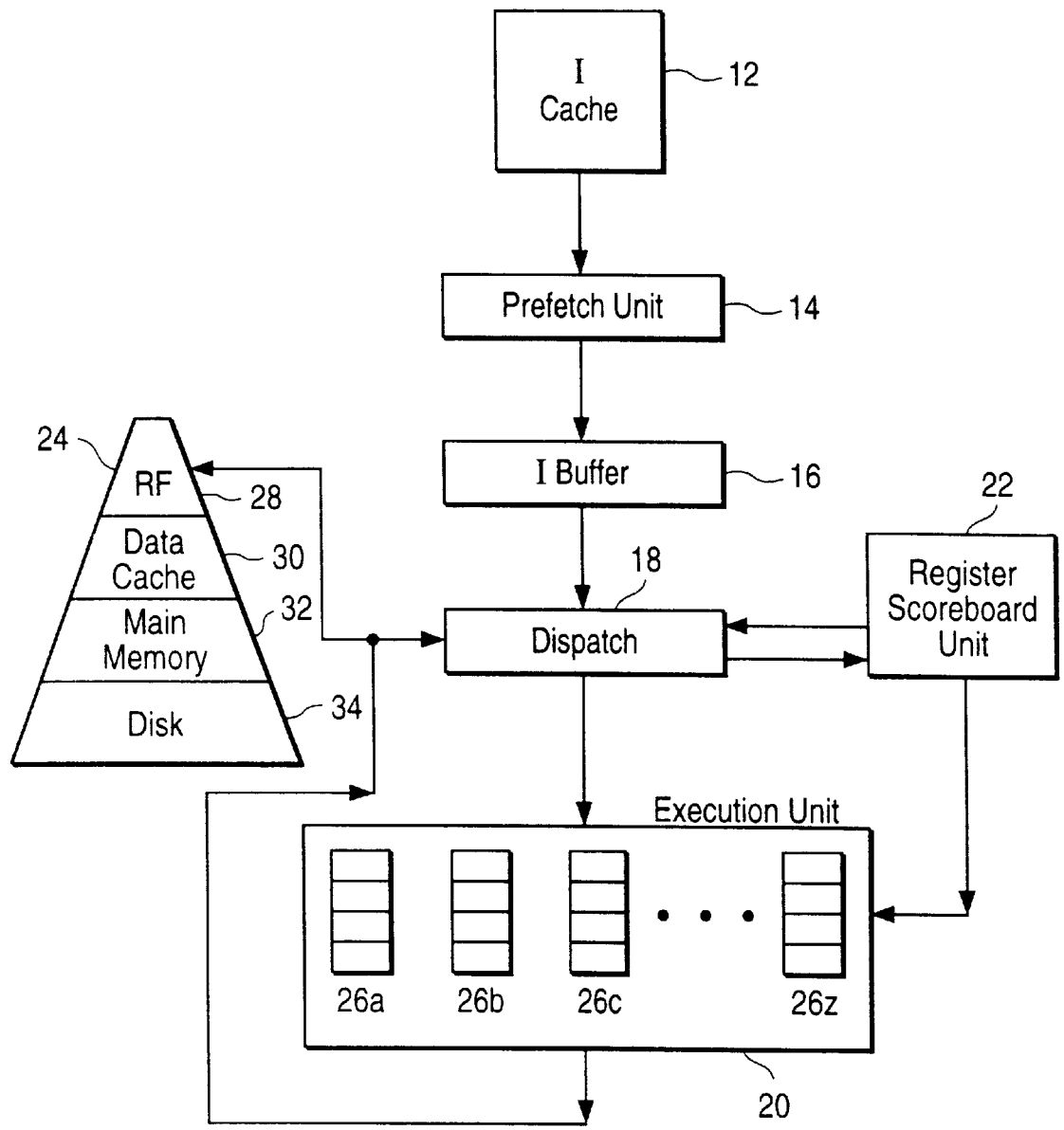
FIG. 1 illustrates a processor architecture according to the prior art.
Figure 2:
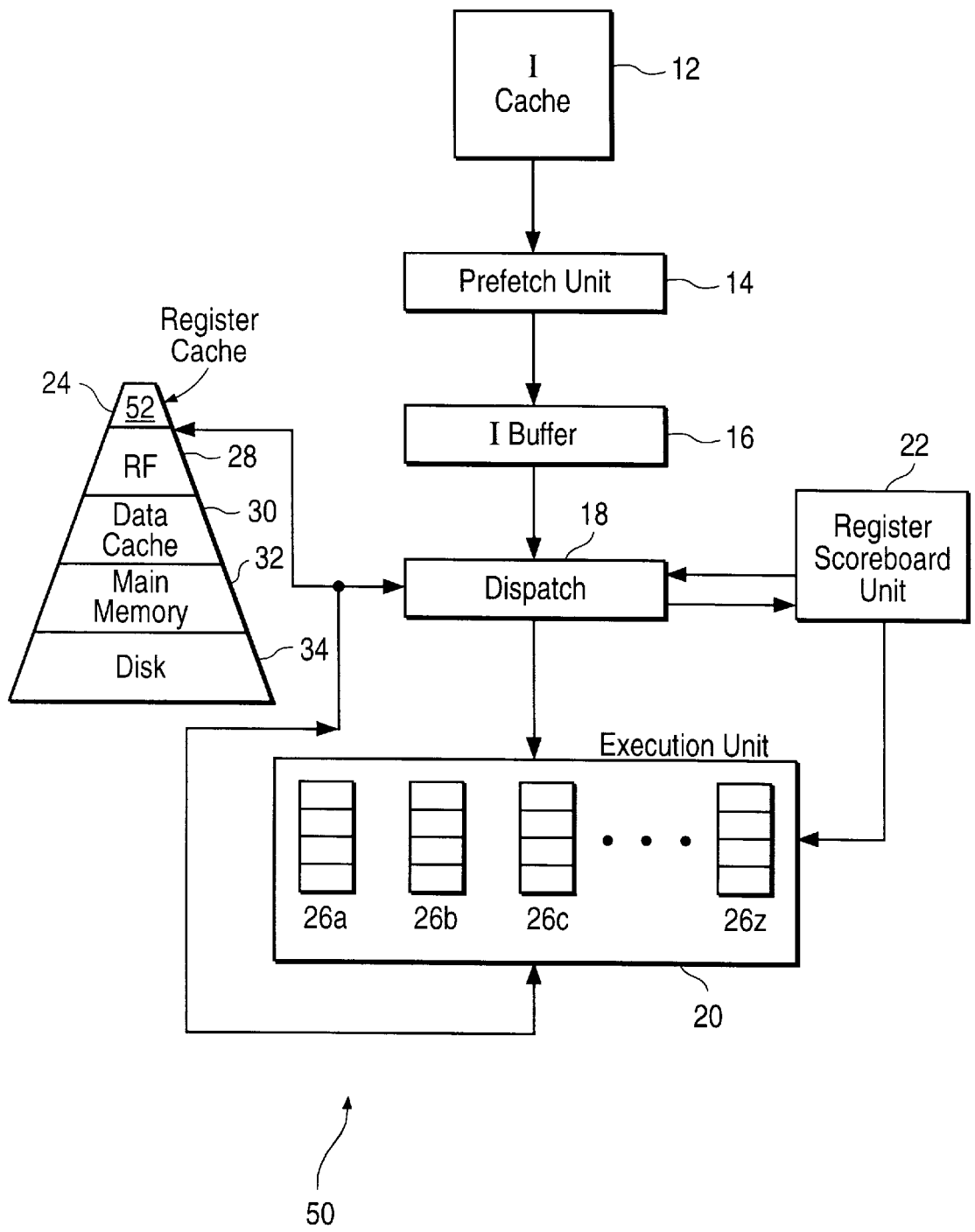
FIG. 2 illustrates a register cache for a processor.

For the sake of completeness, a brief description of a register cache as set forth in the above-mentioned parent application is provided. Referring to FIG. 2, a block diagram of a computer processor having a register cache is shown. The computer processor 50 includes an instruction cache 12, a prefetch unit 14, an instruction buffer 16, a dispatch unit 18, a processing unit 20, including a number of pipelines 26a through 26z, and a register scoreboard unit 22. The computer processor 50 also includes a memory hierarchy 24 including a register cache 52, a register file (RF) 28, a data cache 30, the instruction cache 12, main memory 32, and disk storage 34. Like elements that perform the same or similar functions in FIG. 2 are designated by the same reference numerals as those in FIG. 1, and therefore are not described in detail herein. It should be noted that the register file 28 refers to the visable set of registers available to the programmer and is defined by the instruction set used by the processor 50. It does not refer to the physical memory used to store the individual registers of the register file 28.

The register cache 52 is positioned adjacent to the dispatch unit 18 and the processing unit 20. During each clock cycle, the dispatch unit 18 checks the processing unit 20 to see which pipelines 26 are available and status ascertains the register values needed by the next (i) instructions in the instruction buffer 16 considered for dispatch. For the instructions among the next (i) instructions where pipeline resources are available, the dispatch unit 18, checks the register scoreboard 22 to determine if any of the needed register values are currently being recomputed in the pipeline 26. If a needed register value is immediately available by a bypassing operation, the register value is bypassed to the pipeline 26 that is going to execute the instruction that needs the register value. If the register value is not immediately available because it is being recomputed, the instruction that needs the register value may be stalled. If a needed register value is not in the pipelines 26, the dispatch unit 18 accesses the register cache 52. If a hit occurs, the register cache 52 provides the needed register value for the instruction. If a miss occurs, the needed register value is obtained from the memory containing the register file 28. The overall register caching effect is therefore achieved by the combination of bypassing and the register cache 52. The bypassing operation provides register values that have been recomputed and are still in the pipelines 26. The register cache 52 provides register values that have recently exited the pipelines 26.

The register cache 52 described in the parent application provides a number of advantages and solves a number of problems associated with the prior art. Statistical studies indicate that bypassing and the register cache 52, when properly sized and managed, maintains a hit rate in the order of ninety to ninety-five percent (90 to 95%) or better. With such a high hit rate, a majority of the requests for register values for instruction about to be dispatched are satisfied by either a bypassing operation or the register cache 52. As a result, the memory containing the register file 28 is not often accessed. The Applicants believe that the register cache 52 helps overcome many of the impediments confronting the designers of the next generation of processor chips. The register cache 52 of the parent application offers a far more elegant solution to accessing register values than that offered by the brute force approach of implementing the register file 28 in a multi-ported SRAM array as described in the prior art.

Figure 3:
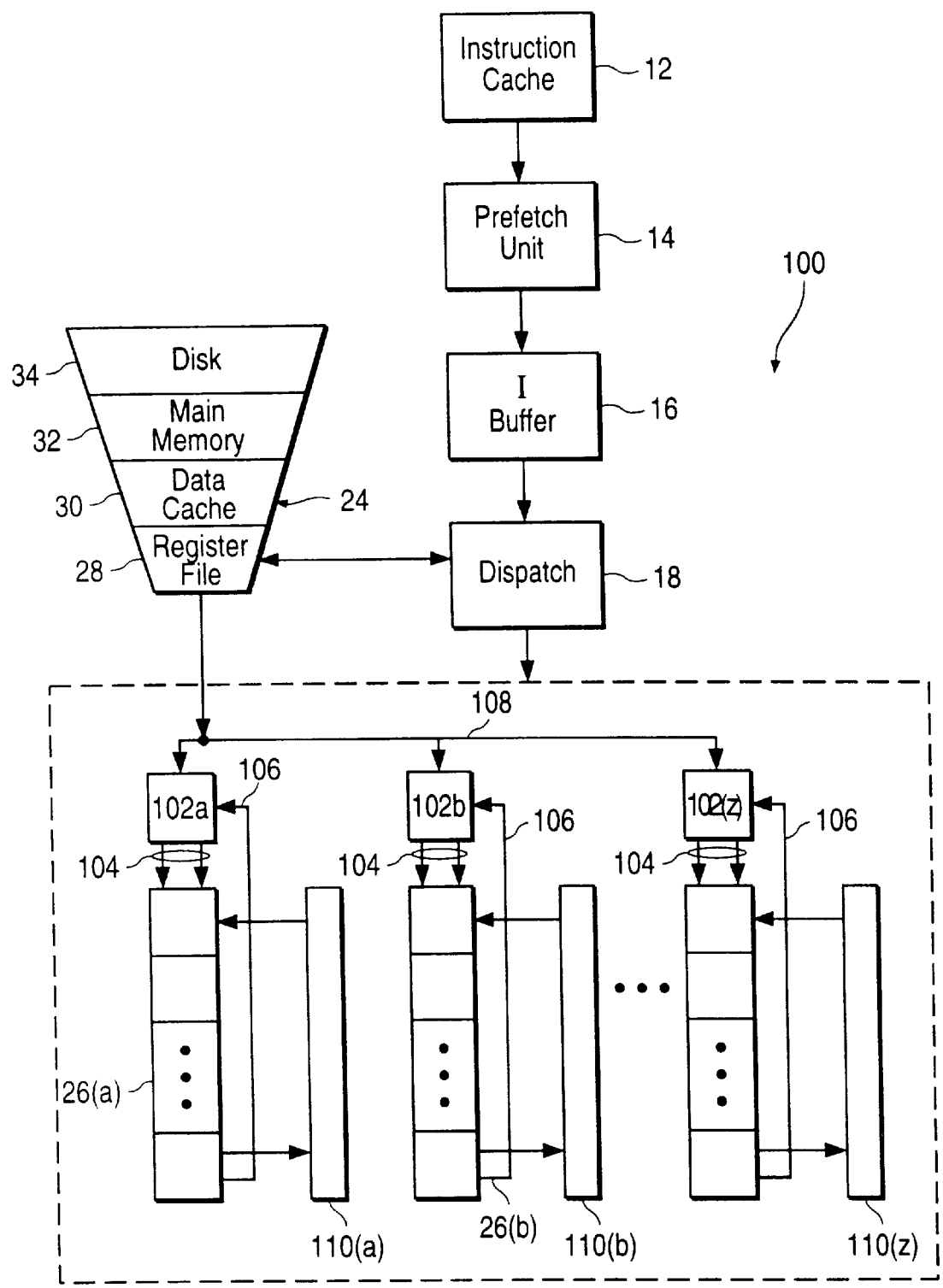
FIG. 3 illustrates illustrates a distributed register cache architecture for a processor according to the present invention.

Referring to FIG. 3, a block diagram of a processor having distributed register caches according to the present invention is shown. The processor 100 includes an instruction cache 12, a prefetch unit 14, an instruction buffer 16, a dispatch unit 18, and a processing unit 20, including a number of pipelines 26a through 26z. The processor 100 also includes a memory hierarchy 24 including a register file 28, a data cache 30, the instruction cache 12, main memory 32, and disk storage 34. Like elements that perform the same or similar functions in FIG. 3 are designated by the same reference numerals as those in FIG. 2, and therefore are not described in detail herein. It should be noted that with the present invention, the SRAM memory containing the register file 28 is optional. The register values of the register file 28 can be contained in any backing store memory, such as the data cache 30 or main memory 32.

The processing unit 20 in the processor 100 also includes a plurality of distributed register caches 102a through 102z, each associated with one of the pipelines 26a through 26z respectively. An interconnect 108 is coupled between each of the register caches 102 and the memory containing the register file 28. In the embodiment illustrated in FIG. 3, two read ports 104 and one write port 106 are provided between each register cache 102 and its associated pipeline 26. According to other embodiments of the invention, the number of read ports 104 and the number of write ports 106 may vary so that fewer or more register values may be either read from or written to the register cache 102 by the associated pipeline 26. For example, the number of read and write ports provided may be set to equal the maximum number of register value that may be read or written to a particular register caches 102, as determined by the instructions of the instruction set.

A plurality of local bypass logic circuits 110a through 110z are also associated with each pipeline 26a through 26z respectively. The local bypass unit 110 is responsible for passing recomputed register values in the associated pipeline 26 to a younger instruction entering the same pipeline 26. In contrast with the register scoreboard 22 described in the prior art and the parent application, the local bypass units 110 are not capable of transferring register values between two different pipelines 26. As a result, much of the overhead associated with global bypassing between the various pipelines 26 of the processor is avoided.

The processor 100 requires the use of a coherency protocol for maintaining coherency among the register values in the pipelines 26a through 26z. Without a coherency protocol, problems in the consistency of register values may arise. Consider an example where pipeline 26a and pipeline 26b both locally contain the same register value (e.g., R1) in the their respective caches 102a and 102b. If pipeline 26a recomputes the register value R1, an inconsistent data state will occur if the copy of register value R1 in register cache 102b is not updated or removed. If the second pipeline 26b subsequently executes an instruction using the out-of-date (stale) register value R1 contained in register cache 102b, an incorrect result may be obtained. In accordance with the present invention, a wide variety of well known cache coherency protocols may be used. For example, write-through, write-first, and ownership (i.e., MOESI, MESI and MSI) snooping protocols may be used. For a detailed description of these and other protocols, see the article entitled "Design and Implementation of An Integrated Snooping Data Cache", Gaetano Borriello et al. University of California Berkeley, Calif., Computer Science Division, Report No. UCB/CSD/84/199, September 1984, incorporated by reference herein. The Applicants have also developed a new "one-copy" protocol that is suitable for the distributed register caches of the present invention. The one-copy protocol is described in detail below.

One-Copy Cache Coherency Protocol

In the one-copy protocol, only one addressable copy of a register value is allowed to exist in all the register caches 102 and in the register file 28 (or the backing store copy) at a time. If the register cache 102a has a valid copy of a register value R, then a valid and addressable copy of the register value R cannot exist in the register file 28, or another one of the register caches 102b through 102z.

Referring to FIG. 4, a table 130 used to implement the one-copy protocol in the distributed register cache architecture of the present invention is shown. In accordance with one embodiment, the table 130 resides in and is maintained by the dispatch unit 18. The table includes entries $132_{(1)}$ through 132(m), where (m) equals the number of register values (m) in the register file 28. Each entry 132 includes a first storage location 134 for storing a register value identifier $R_{(1)}$ through $R_{(m)}$, a second set of storage locations 136a through 136z, each corresponding to the register caches 102a through 102z respectively, and a third storage location 138 implicit corresponding to the register file 28 (or other backing store memory). For each entry $132_{(1)}$ through $132_{(m)}$, one of the storage locations 136a through 136z and 138 is set to identify where the single valid and addressable copy of the of the register resides in the processor 100. As the location of the one copy of the register value changes, the table 130 is updated. In an alternative embodiment, the storage location 138 can be removed. If none if the storage locations 136a through 136z is set for a particular register, then it is implied that the single copy of the register is in the register file 28.

Consider the first seven entries 132 in the table 130 for example. Referring to entries $132_{(1)}$ and $132_{(2)}$, the flag is set (1) in storage locations 136a for both entries, indicating that the register cache 102a has the single valid and addressable copy for both the register values R1 and R2. For register entry $132_{(3)}$, the flag in storage location 138 is set (1), indicating that the register file 28 (or other backing store memory) has the single copy of the register value R3. Referring to entries $132_{(4)}$ through $132_{(7)}$, the flag in storage location 136b is set for these entries, indicates that the register cache 102b has the single valid copy of the register values R4, R5, R6 and R7 respectively.

The handling of source registers and destination registers in the one-copy protocol are handled differently. The guidelines for handling destination registers and source registers are provided below.

1. Destination Registers—if a register value R is designated by a first instruction as a destination register, then the only valid and addressable copy of the register value R in the processor 100 exists in the pipeline 26 that is executing the first instruction.

When a register value is designated as a destination register, the previous value of the register remains in the register cache 102 associated with the pipeline 26 that is executing the instruction. The previous copy of the register value remains in the register cache 102 until the new value is recomputed and written into the register cache 102. In the event of a trap, the execution of the instruction may be aborted, resulting in a destination register currently being recomputed to be unwound and restored to its previous value. Thus, the previous value of the register value needs to be saved. The previous copy of a register value may thus be described as a "place holder" for a destination register until the instruction writing to the register is completed.

If a younger instruction needs a copy of a destination register value of an older instruction being executed, the younger instruction may obtain the register value in one of two ways. The register value may be obtained by a local bypassing operation performed by bypass unit 110 if the younger instruction is dispatched to the same pipeline that is executing the older instruction. On the otherhand, if the younger instruction is dispatched to another pipeline 26, then the needed register value can only be obtained by a transaction on the interconnect 108 in embodiments that provide for only local bypassing.

2. Source Registers—Under the one-copy protocol, it is possible for two copies of a register value to co-exist in pipelines 26 as source registers. When a register value is designated as a source register for an instruction, the source register in the corresponding pipeline 26 assumes a non-addressable state. In otherwords, since an instruction cannot recompute the value of a source register, it is permissible for two or more copies of a source register value to co-exist in the pipelines 26.

Operation of the one-copy protocol is best explained using the execution of a group of instructions that rely on the register values R1 through R7 as source and destination registers as examples. The initial location of the one copy of each of the register values R1 through R7 is provided in the table 130, as illustrated in FIG. 4. For the sake of simplicity, the examples are described on a two pipeline (i.e., 26a and 26b) processor. The instruction, in program order, and the pipeline 26 that the instruction is to be executed in is provided in Table II.

TABLE II

| Program Order | Instruction | Pipeline |
| --- | --- | --- |
| I1 | ADD R1, R2 → R3 | 26a |
| I2 | ADD R2, R4 → R5 | 26a |
| I3 | SUB R3, R6 → R7 | 26b |
| I4 | SUB R3, R7 → R7 | 26b |
| I5 | MOV R7 → R4 | 26a |

EXAMPLE 1

In the first example, the dispatch unit 18 considers the dispatch of instruction I1 (ADD R1, R2→R3) to pipeline 26a. Prior to dispatch, the dispatch unit 18 checks table 130, and learns that register values R1 and R2 are both contained in the register cache 102a. The one copy of register value R3, however, is contained in the register file 28. The dispatch unit 18 dispatches the instruction I1 and initiates a transaction on the interconnect 108 requesting that the one valid copy of register value R3 be transferred to register cache 102a. When the register values R1 and R2 are read from the register cache 102a and the register value R3 is received, the instruction I1 enters the pipeline 26a for execution. The table 130 is updated to indicate that the one copy of register value R3 has been transferred to register cache 102a.

EXAMPLE 2

In the second example, the dispatch unit 18 considers the dispatch of the second instruction I2 (ADD R2, R4→R5) to pipeline 26a. The dispatch unit 18 checks the table 130 and learns that register value R2 is already in the register cache 102a, and therefore, no further action need be taken with respect to this register value. On the otherhand, the table 130 indicates that register values R4 and R5 are in register cache 102b. Accordingly, the dispatch unit 18 dispatches the instruction I2 and initiates a transaction to transfer register value R4 and R5 to the register cache 102a. When the register values R4 and R5 are received, the instruction I2 enters the pipeline 26a for execution. The table 130 is updated to indicate that the single copies of register R4 and register R5 have been transferred to register cache 102a.

EXAMPLE 3

In the third example, the dispatch unit 18 considers the dispatch of the third instruction I3 (SUB R3, R6→R7) to pipeline 26b. Prior to dispatch, the dispatch unit 18 again checks table 130 and learns that register value R6 and register value R7 are already in the register cache 102b. The one copy of register value R3, however, is in register cache 102a. In response, the dispatch unit 18 initiates a transaction to transfer the one copy of register value R3 to register cache 102b. If instruction I1 has completed execution and has written register value R3 back to register cache 102a, the transfer occurs immediately. If instruction I1 has not completed execution in pipeline 26a, then instruction 14 is stalled until the recomputed register value R3 becomes available. When register value R3 becomes available, it is transferred to register cache 102b and the instruction I3 is dispatched to pipeline 26b for execution. The table 130 is updated to indicate that the one copy of register value R3 has been transferred to register cache 102b.

EXAMPLE 4

In the fourth example, the dispatch unit 18 considers the dispatch of the fourth instruction I4 (SUB R3, R7→R7) to pipeline 26b. Prior to dispatch, the dispatch unit 18 checks table 130 and learns that the one copy of register value R3 and register value R7 are both already in the register cache 102b. Since two copies of a source register are permitted in the pipeline 26, register value R3 is immediately available. Register value R7 though, is handled differently because it is a destination register. The bypass unit 110b recognizes that register value R7 is being recomputed by an older instruction (I3). Accordingly, the Instruction 14 is dispatched and the bypass unit 110b bypasses the register value R7 to instruction I4 when the register value becomes available.

EXAMPLE 5

In the fifth example, the dispatch unit 18 considers the dispatch of the fifth instruction I5 (MOV R7→R4) to pipeline 26a. Prior to dispatch, the dispatch unit 18 checks table 130 and learns that the one copy of register value R4 is already in register cache 102a. The table 130, however, indicates that the one copy of register value R7 is in register cache 102b. The dispatch unit 18 dispatches I5 and initiates a transaction to transfer the register value R7 to register cache 102b. If instruction I4 is still being executed, register value R7 is not immediately available.

Eventually, when register value R7 is recomputed, is is written to register cache 102b and then immediately transferred to register cache 102a. Thereafter, instruction I5 is executed. Only the most recently recomputed register value of R7 (generated by instruction I4) can be transferred to pipeline 26a. Incorrect results may be obtained if a previous register value for R7 (i.e., as recomputed by instruction I3) is transferred to the pipeline 26a. The local bypass circuit 110b keeps track and makes sure that only the most recently recomputed register values are transferred to other pipelines if needed.

The present invention was described with the dispatch unit 18 controlling the transfer of register values from pipeline 26a to pipeline 26z as needed in the processor 100. In accordance with another embodiment of the invention, the responsibility for generating request transactions for register values on the shared interconnect 108 can be shifted to the pipelines 26. For example, if an instruction is dispatched to a pipeline 26, the pipeline 26 can ascertain the register values needed by the instruction, check its local cache 102 for register values, and finally, generate a transaction on the shared interconnect requesting any needed register values from the other register caches 102 or the register file 28 if needed.

According to another embodiment, the local bypass units 110 can also be replaced or used in cooperation with a global register scoreboard unit. The global register scoreboard unit can be programmed to manage global bypassing of register values. For example, if a register value is being recomputed in a first pipeline 26a, and a younger instruction that needs the register value is dispatched to a second pipeline 26b, the register scoreboard unit can direct the transfer of the register value from pipeline 26a to pipeline 26b after the first instruction recomputes the register value. When a global bypass operation occurs, the previous copy of the register value remains in the previous register cache 102 until the recomputed register value is written to the register cache associated with the pipeline 26 that received the register value.

The one-copy protocol of the present invention may also be used with either in-order instruction issue processors or out-of-order instruction issue processors. With in-order issue processors, instructions are issued in program order. Nevertheless, situations may occur where a previous value of a register needs to be kept in a register cache 102, even after the instruction responsible for moving the register value to the register cache has been executed. Consider a situation where a first instruction, which designates register R3 as a destination register, is launched into the first pipeline 26a. If the register value is subsequently bypassed to a second pipeline 26b where it is recomputed by a younger instruction, the register cache 102a must keep a copy of the previous value of R3 until the pipeline 26b writes the recomputed value for R3 into register cache 102b. The previous copy of the register value R3 needs to reside in the register cache 102a until the register value is recomputed in pipeline 26b because of the possibility of a trap. If a trap occurs, the pipelines 26 are unwound and register values are reset to their previous values. With an out-of-order processor, the practice of saving a previous value of a register is also necessary. Using the same example as above, the previous value of R3 is stored in register cache 102a, until the recomputed register value of R3 is written into register cache 102b. However, with an out-of-issue processor, the writing of the recomputed register value of R3 is stalled until all the older instructions that needed the previous value of R3 are executed. If the writing of the recomputed register value of R3 is not stalled, then the older instructions may be executed using an incorrect value of register R3, which may result in processing errors.

Regardless of the type of cache coherency protocol used, compiler scheduling techniques may be used to help reduce the traffic on the interconnect 108. During the compilation of a program, the instructions may be compiled so that there is relatively little sharing of register values between two pipelines 26 in the processor 100. For example, the compiler may assign the instructions of a first thread to be executed on a first pipeline 26a, and the instructions of a second thread on a second pipeline 26b. As a result, the register values defined by the first thread tend to be localized in the first register cache 102a, and the register values defined by the second thread tend to be localized in the second cache. The amount of cross communication of register values on the interconnect 108 therefore tends to be reduced.

A cache replacement policy must also be used to replace register values from the register caches 102a through 102z, regardless of the type of cache coherency protocol used. According to various embodiments of the invention, a least recently used policy, a first-in-first-out, or other cache replacement policies may be used. Since these policies are all well known in the art, a detailed description is not provided herein.

Although the foregoing invention has been described in detail with respect to several specific embodiments, it will be apparent that certain changes and modifications may be made without departing from the spirit of the invention. For example, the present invention may be used in any scalar-pipeline processor, regardless of the number of pipelines or the maximum number of instructions that may be issued in a cycle. The technique of the present invention may be used with a very long instruction word (VLIW) processor, reduced instruction set (RISC) processor, or complex instruction set (CISC) processors. Further, the concept of distributed register caches can be applied to both integer register values and/or floating point register values. It is intended that the specification only be exemplary, and that the true scope of the invention be indicated by the following claims.

What is claimed is:

1. A processor, comprising:
 a processing unit;
 a plurality ot pipelines contained in the processing unit, the plurality of pipelines configured to execute instructions, some of the instructions defining register values from a register file; and
 a plurality of register caches associated with the plurality of pipelines, the plurality of register caches configured to store register values generated by the execution of the instructions in the pipelines.

2. A processor, comprising:
 a processing unit;
 a plurality of pipelines contained in the processing unit, the plurality of pipelines configured to execute instructions, some of the instructions defining register values from a register file;
 a plurality of register caches associated with the plurality of pipelines, the plurality of register caches configured to store register values generated by the execution of the instructions in the pipelines; and
 a coherency mechanism to maintain coherency among the register values in the processing unit.

3. The processor of claim 2, wherein a selected one of the plurality of register caches includes enough read ports and write ports to satisfy the maximum number of read ports and write ports needed to support an instruction set intended to run on the processor.

4. The processor of claim 2, wherein the coherency mechanism permits only one addressable copy of each of the plurality of register values to exist in the plurality of pipelines.

5. The processor of claim 2, wherein a dispatch unit, coupled to the plurality of pipelines, is configured to dispatch instructions to the plurality of pipelines and is configured to coordinate the transfer of register values among the plurality of register caches and the register file as needed.

6. The processor of claim 2 wherein one of the pipelines is configured to coordinate the transfer of register values among the plurality of register caches and the register file as needed to execute instructions.

7. The processor of claim 2, wherein each of the plurality of pipelines each further comprises a bypass logic circuit for bypassing a recomputed register value from an older instruction to a younger instruction in the pipeline.

8. The processor of claim 2, further comprising a memory to store the register file.

9. The processor of claim 2, further comprising a replacement element configured to replace register values contained in the register caches in accordance with a replacement policy.

10. The processor of claim 2, wherein the plurality of register caches are associated with the plurality of pipelines respectively.

11. The processor of claim 2, further comprising the register file coupled by an interconnect to the coherency mechanism.

12. The processor of claim 11, wherein register values are transferred over the interconnect between the plurality of register caches and the register file.

13. The processor of claim 2, wherein the coherency mechanism relies on a snooping cache protocol to maintain coherency among the plurality of register caches.

14. The processor of claim 13, wherein the snooping cache protocol implements one of the following policies: write-through; write first; or ownership.

15. The processor of claim 2, wherein the coherency mechanism permits only one addressable copy of a register value to exist in the plurality of register caches at a time.

16. The processor of claim 15, further comprising a memory for maintaining a table of register entries which indicates where the one addressable copy of each of the plurality of register values resides in the processor at a given time.

17. The processor of claim 15, wherein the coherency mechanism permits two non-addressable copies of a register value to co-exist in the plurality of pipelines.

18. The processor of claim 15, wherein the coherency mechanism requires that a younger instruction wait for a register value that is being recomputed by an older instruction until after the older instruction has recomputed the register value.

19. The processor of claim 18, wherein the younger instruction receives the register value that is being recomputed by the older instruction by a bypassing operation.

20. The processor of claim 18, wherein the younger instruction receives the register value that is being recomputed by the older instruction by way of a bypass element that couples the plurality of register caches.

21. The processor of claim 20, further comprising a register scoreboard unit, coupled to the plurality of pipelines, and configured to manage the bypassing of register values between the plurality of pipelines.

22. A method of operating a processor, comprising the steps of:

executing instructions in a plurality of pipelines in the processor, some of the instructions defining registers from a register file;

updating certain register values associated with specific ones of the registers of the register file during the step of executing instructions in the pipelines;

inserting the updated register values into a plurality of register caches associated with the plurality of pipelines in the processor; and maintaining coherency among register values in the processor.

23. The method of claim 22, wherein the maintaining step further comprises the step of permitting one addressable copy of each of the registers in the processor at a time.

24. The method of claim 22, wherein the maintaining step further comprises the step of permitting two or more non-addressable copies of one of the registers to exist in the processor at the same time.

25. The method of claim 22, further comprising the step of bypassing register values in one of pipelines to a second one of the pipelines in the processor.

26. The method of claim 22, further comprising the step of bypassing register values within one of the pipelines in the processor.

27. The method of claim 22, wherein the maintaining step further comprises the step of maintaining coherency using a snooping protocol.

28. The method of claim 27, wherein the snooping protocol step further includes the step of using one of the following protocols: write-through; write first; or ownership.

29. The method of claim 22, further comprising the step of replacing the registers in the plurality of register caches in accordance with a replacement policy.

30. The method of claim 29, further comprising the step of writing the replaced registers to a memory containing the register file.

* * * * *